INVENTOR.
BY Toshinobu Kawazoe
Kemon, Palmer & Estabrook

United States Patent Office 3,690,974
Patented Sept. 12, 1972

3,690,974
METHOD FOR MANUFACTURING A TEMPERATURE DETECTING WIRE
Toshinobu Kawazoe, 863–1 Shiro, Tokorozawa-shi, Saitama-ken, Japan
Filed Dec. 2, 1969, Ser. No. 881,425
Claims priority, application Japan, Dec. 17, 1968, 43/92,026; Jan. 21, 1969, 44/3,815
Int. Cl. H01b 13/06
U.S. Cl. 156—51
5 Claims

ABSTRACT OF THE DISCLOSURE

A method for manufacturing a temperature detecting wire which comprises the steps of heating a mixture of vanadium pentoxide and diammonium hydrogenphosphate to a temperature of 500° to 550° C. in an atmosphere of nitrogen gas, reducing most of the vanadium pentoxide to vanadium dioxide by hydrogen evolved through thermal decomposition of the diammonium hydrogenphosphate, allowing a reaction mixture to cool in an atmosphere of nitrogen gas, and then heating it again to a temperature of 1100° to 1200° C. to complete the reaction of reduction, quenching the resultant product to form a lump of fine crystals of vanadium dioxide, grinding said lump of fine crystals of vanadium dioxide into powders of a thermosensitive material, adding to said powders a binder mainly consisting of synthetic resin, and inserting a thermosensitive layer consisting of a mixture of said powders and binder into the interspaces between a plurality of conductive wires.

BACKGROUND OF THE INVENTION

The present invention relates to a method for manufacturing a temperature-detecting wire wherein, only in case temperature rises above a predetermined level, there flows signal current from one conductive wire to the other.

A temperature detecting wire heretofore known includes the type prepared by inserting a material having negative temperature coefficient of resistance into the interspaces between a plurality of conductive wires. And a known thermosensitive material having said negative temperature coefficient of resistance is largely formed of approximately tetravalent vanadium oxide. A granular sintered product prepared by moulding and sintering a material mainly consisting of said vanadium oxide is used as a semiconductor element displaying varying negative resistance. This granular sintered product has indeed favorable characteristics as a thermosensitive material, but is handicapped by the fact that when inserted into the interspaces between conductive wires, the powdered form of said granular sintered product fails to provide a practically effective thermosensitive layer. A powdered thermosensitive material makes it possible to produce in quantity a temperature-detecting wire having a thermosensitive layer interposed between its conductive wires by coating the entire length of said conductive wires with a mixture of said powdered material and binder, thus offering industrial advantage. However, a thermosensitive layer prepared by inserting a mixture of powders obtained by grinding said granular sintered material and synthetic resin loses the aforesaid favorable properties if said layer has a thickness of more than 30 microns, namely, has the disadvantage that its resistance varies only slightly over a broad range of temperature. On the other hand, if reduced to below 30 microns in thickness, said thermosensitive layer decreases in mechanical strength, failing to be put to practical application.

With another known type of temperature detecting wire, there are used large single crystals of vanadium dioxide as a thermosensitive material. However, formation of said single crystals is effected by a time-consuming growth process, so that it is unadapted for industrial production. Moreover, there are encountered extreme difficulties in securely interposing a thermosensitive material in the form of such single crystals between the conductive wires of a temperature detecting wire.

SUMMARY OF THE INVENTION

The present invention is charactedized by heating a mixture of vanadium pentoxide and ammonium compounds at a first stage to a temperature of 500° to 550° C. in an atmosphere of inert gas, reducing most of the vanadium pentoxide to vanadium dioxide by hydrogen evolved through thermal decomposition of the ammonium compound, allowing a reaction mixture to cool in an atmosphere of inert gas, heating it at a second stage to a temperature of 1100° to 1200° C. in an atmosphere of inert gas to complete the reaction of reduction, quenching the resultant product to form a lump of fine crystals of vanadium dioxide, grinding said lump of fine crystals of vanadium dioxide to form powders of a thermosensitive material, adding a binder mainly consisting of synthetic resin to said powders, and interposing a thermosensitive layer consisting of a mixture of said powders and binder between a plurality of conductive wires.

According to the present invention, quenching after completion of the aforesaid reaction of reduction allows vanadium dioxide to be produced in a lump of stable fine crystals of tetragonal system, so that thermosensitive powders prepared from such lump display excellent negative temperature coefficient of resistance which present little variation. A temperature detecting wire prepared by inserting a thermosensitive layer consisting of a mixture of the aforesaid powders and binder between a pluarlity of conductive wires varies in resistance sharply to an extent of $\frac{1}{1,000}$ to $\frac{1}{10,000}$ with respect to a prescribed range of temperature, even if said layer increases to hundreds of microns in thickness, and moreover displays such a great mechanical strength as withstands more than 100,000 bending tests. Further, the present invention is characterized in that it provides a temperature detecting wire whose resistance-temperature properties little vary in its lengthwise sections and enables such excellent temperature detecting wire to be industrially manufactured in quantity.

DESCRIPTION OF THE PREFERRED EMBODIMENTS

Figure 1:
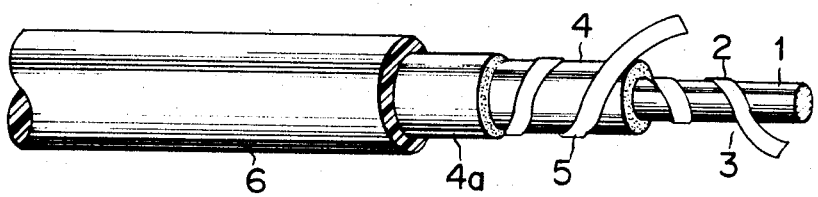
FIG. 1 is a perspective view of a temperature detecting wire prepared by an embodiment of the present invention.

There will now be described the sequential steps of manufacturing a temperature detecting wire according to an embodiment of the present invention. Vanadium pentoxide ($V_2O_5$) and an ammonium compound, for example, diammonium hydrogenphosphate (($NH_4)_2HPO_4$) are mixed with water. After agitation and drying, the mixture is used as a starting material. When heated to 500° to 550° C. in an atmosphere of inert gas such as nitrogen gas ($N_2$), the mass releases ammonia due to thermal decomposition of diammonium hydrogenphosphate and further evolves hydrogen to reduce most of the vanadium pentoxide. When allowed to cool, amorphous product is obtained. When heated again to 1100° to 1200° C. in an atmosphere of inert gas such as nitrogen gas and then quenched, said product is turned into a vary pure vanadium dioxide where there cannot be detected any other form of vanadium than the one of tetravalence even by X-ray diffractometer. This product is a bluish lump consisting of numerous fine crystals and relatively easy to grind. When ground, it is made into thermosensitive powders having negative temperature coefficient of resistance. Said powders and a binder mainly consisting of synthetic resins such as polyurethane resin, polyester resin or acrylic resin and containing additives such as a plasticizer, softener, or hardener are mixed into a pasty form. This paste is coated on the conductive wires constituting a temperature detecting wire in the manner described below so as to form a thermosensitive layer. Through said paste is passed a conductive wire prepared by spirally winding a foil of copper or cadmium containing copper about a core formed of a bundle of glass fiber coated with insulating synthetic resins such as polyamide resin, polyester resin, or polyethylene. After passing through the paste, the conductive wire is heated to harden the binder contained in said paste. Thereafter, the conductive wire is again introduced through said paste to allow it to be deposited thereon, followed by heating to harden the binder. This cycle of steps is repeated several or dozens of times to form a thermosensitive layer. Around said thermosensitive layer is spirally wound a foil of copper or cadmium containing copper and, if required, said foil is again coated with the aforesaid paste, and further heated to harden the binder contained therein. Where necessary, there is applied on said coated foil or layer an electrical insulating material such as polyamide resin or polyvinyl chloride resin to form a temperature detecting wire having a thermosensitive layer consisting of powders of fine crystals of vanadium dioxide and a binder interposed between the conductive wires.

Ammonium compounds used in the method of the present invention include, in addition to the aforementioned diammonium hydrogenphosphate, any other type which is slowly decomposed to produce an atmosphere having a lasting weak reducing property, such as ammonium amidosulfate ($NH_4SO_3NH_2$), ammonium chromate $$((NH_4)_2CrO_4)$$

ammonium thiosulfate ($(NH_4)_2S_2O_3$), ammonium sulfide ($(NH_4)_2S$), ammonium sulfate ($(NH_4)_2SO_4$), ammonium hydrogen sulfate ($NH_4HSO_4$) and ammonium phosphate ($(NH_4)_3PO_4 \cdot 3H_2O$). Further, addition, if required, of calcium carbonate ($CaCO_3$) to a reaction system accelerates the progress of reducing reaction to elevate a yield of fine crystals of vanadium dioxide.

For the purpose of the present invention, heating in inert gas should be conducted in two steps in order to increase the formation of fine crystals of vanadium dioxide. The first stage heating is carried out at a temperature of 500° to 550° C., and the second stage heating at 1100° to 1200° C. If performed at a temperature of less than 500° C., the first stage heating will not allow reaction of reduction fully to proceed, whereas, if conducted at a temperature beyond 550° C., said heating will unduly accelerate said reaction. Again, if carried out at a temperature of less than 1100° C., the second stage heating will not fully complete reaction of reduction, whereas heating to over 1200° C. will not display any particularly favorable effect and sometimes conversely decrease the yield of the aforesaid fine crystals. It is generally preferred that heating at both stages be continued for about 10 to 20 minutes.

According to the present invention, quenching of a product obtained after heating to 1100° to 1200° C. in an atmosphere of inert gas may be effected by cold water or blowing streams of cold inert gas such as nitrogen gas or argon gas. In this case, the cold water or inert gas is desired to have a temperature of 5° to 10° C. As compared with the cold water process, the latter process applying streams of cold inert gas is several times more effective in obtaining uniform fine crystals of vanadium dioxide and realizes a far greater yield of said crystals, namely, produces a bluish black lump almost entirely consisting of fine crystals and in consequence easy to grind. Accordingly, quenching by streams of cold inert gas results in a product having particularly excellent properties. For the purpose of the present invention, it is preferred that the particle size of fine crystals be 200 mesh max.

When a temperature detecting wire of the present invention involving a thermosensitive layer is used as an attachment to the heating wire of an electrically heated blanket, said thermosensitive layer is desired to have a thickness of about 70 to 200 microns from the standpoint of practical application.

Now returning to the subject, the conductive wires of a temperature detecting wire of the present invention may consist of any known material such as flat wires of copper or cadmium containing copper. With a temperature detecting wire manufactured by the method of the present invention, its thermosensitive layer can be impressed with a withstand voltage of several to dozens of volts, so that one of the conductive wires is allowed to be concurrently used as a heating wire.

Powders of fine crystals of vanadium dioxide and a binder are preferably mixed in the ratio by weight of 80 to 95 to 20 to 5, though said ratio may somewhat vary with the kind of the latter used. It is required that said fine crystals be so arranged as to contact each other in the direction of the thickness of a thermosensitive layer and that the binder be used in such amounts as are sufficient to fill up the gaps between said fine crystals thus arranged.

It will be apparent that the means of arranging both conductive wires and interposing a thermosensitive layer therebetween as involved in the method of the present invention may be replaced by any others than what is described herein.

The present invention will be more clearly understood from the examples which follow.

EXAMPLE 1

There were mixed with water 2 mols of vanadium pentoxide ($V_2O_5$) and 0.5 mol of diammonium hydrogen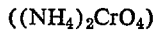phosphate. When stirred 2 hours at a temperature of 100° C. and then dried, the mixture was formed into reddish brown powders. The powders were placed in a furnace in a dish of stainless steel. The furnace was filled with an atmosphere of nitrogen gas ($N_2$) and heated 15 minutes at 550° C. to reduce the mixture. Then the mass was allowed to cool to normal temperature in said nitrogen atmosphere. The furnace still filled with nitrogen gas was again heated 15 minutes at a temperature of 1200° C. to complete the reaction of reducing the vanadium pentoxide ($V_2O_5$) to vanadium dioxide ($VO_2$). Immediately upon being taken out of the furnace, the reduced product was quenched several seconds to 300° to 350° C. in cold water at 5° to 10° C., and again allowed to cool in the nitrogen atmosphere. The resultant lump consisting of fine crystals of vanadium dioxide ($VO_2$) was ground into coarse particles by crusher, and further pulverized to 325 mesh max. in a ball mill sealed with nitrogen gas ($N_2$), followed by screening, to obtain powders of a thermosensitive material having negative temperature coefficient of resistance.

The powders of said thermosensitive material and a binder mainly consisting of polyurethane were mixed in the ratio by weight of 90 to 10 while being subjected to ultrasonic wave vibrations so as to be made into a pasty form. There was used, as shown in FIG. 1, a core 1 formed of a bundle of glass fiber coated with polyamide resin. Around said core 0.5 mm. in diameter was spirally wound a foil 2 of cadmium containing copper 0.05 mm. thick and 0.4 mm. wide to form one of the conductive wires indicated by 3. The entire length of said conductive wire was passed through said paste to allow it to be coated thereon. The coated conductive wire 3 was pressed by being drawn through a die so as to adjust the thickness of coated paste to about 10 microns. The conductive wire was heated to harden the polyurethane used as a binder. The above-mentioned cycle of steps was repeated eight times to form a thermosensitive layer 4 80 microns thick. Around said thermosensitive layer 4 was wound the other conductive wire 5 consisting of a copper foil wire 0.05 mm. thick and 0.4 mm. wide. The assembly was passed through the same paste as mentioned above to allow it to be coated thereon. The coated mass was heated to harden the polyurethane contained in the paste. The foregoing cycle of steps was repeated twice to form another thermosensitive layer 4a to stabilize contact resistance between the conductive wire 5 and thermosensitive layer 4. Around the second thermosensitive layer 4a was extruded polyvinyl chloride resin as the outer coating 6 to form a temperature detecting wire 2 mm. in outer diameter.

Figure 2:
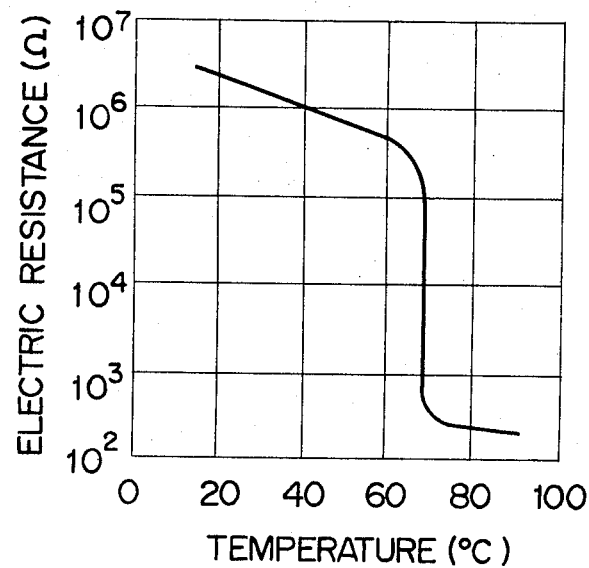
FIG. 2 is a diagram showing the resistance-temperature properties of the temperature detecting wire illustrated in FIG. 1.

One meter of a temperature detecting wire prepared by the aforementioned process was put in a thermostat and the electrical resistance between both conductive wires was measured by wheatstone bridge to determine the resistance-temperature properties of the thermosensitive layer used in said temperature detecting wire. It was disclosed that the resistance varied, as shown in FIG. 2, in an approximately vertical direction to an extent of 1/1,000 with respect to a temperature range of 65° to 75° C.

EXAMPLE 2

There were mixed with water 2 mols of vanadium pentoxide ($V_2O_5$) and 0.5 mol of diammonium hydrogenphosphate (($NH_4$)$_2HPO_4$) and 0.5 mol of calcium carbonate ($CaCO_3$). When stirred 2 hours at a temperature of 100° C. and then dried, the mixture was formed into reddish brown powder. The powders were placed in a furnace in a dish of titanium. The furnace was filled with an atmosphere of nitrogen gas ($N_2$) and heated 15 minutes at 550° C. to reduce the mixture. Then the mass was allowed to cool to normal temperature in said nitrogen atmosphere. The furnace still filled with nitrogen gas was again heated 15 minutes at a temperature of 1200° C. to complete the reaction of reducing the vanadium pentoxide ($V_2O_5$) to vanadium dioxide ($VO_2$). The reduced product was quenched in a nitrogen atmosphere from 1200° C. to normal temperature by strongly blowing streams of cold nitrogen gas ($N_2$) at 5° to 10° C. upon said product for 10 to 15 minutes. The resultant lump consisting of fine crystals of vanadium dioxide ($VO_2$) was ground into coarse particles by crusher and further pulverized to 325 mesh max. in a ball mill sealed with nitrogen gas ($N_2$), followed by screening, to obtain powders of a thermosensitive material having negative temperature coeffecient of resistance.

Figure 3:
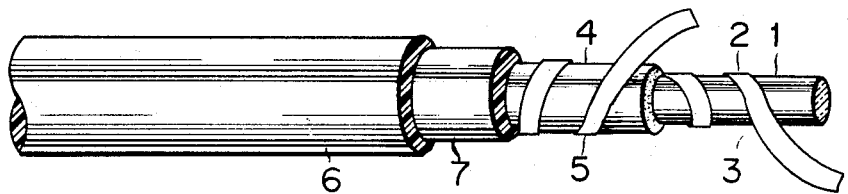
FIG. 3 is a perspective view of a temperature detecting wire prepared by another embodiment of the present invention.

The powders of said thermosensitive material and a binder mainly consisting of polyurethane were mixed in the ratio by weight of 90 to 10 while being subjected to ultrasonic wave vibrations so as to be made into a pasty form. In FIG. 3, one of the conductive wires indicated by 3 was prepared as in Example 1 by spirally winding a foil 2 around a core 1. The entire length of said conductive wire 3 was passed through the aforementioned paste to allow it to be coated thereon, thereby forming on said conductive wire a thermosensitive layer 4 80 microns thick by the same process as used in Example 1. Further around said thermosensitive layer 4 was wound the other conductive wire 5. Around the assembly was extruded a first outer coating 7 0.2 mm. thick consisting of polyamide-base synthetic resin so as to stabilize contact resistance between said thermosensitive layer 4 and conductive wire 5 and increase the bending strength thereof. Further around said first outer coating 7 was extruded polyvinyl chloride resin as a second outer coating 6 to form a temperature detecting wire 2 mm. in outer diameter.

Figure 4:
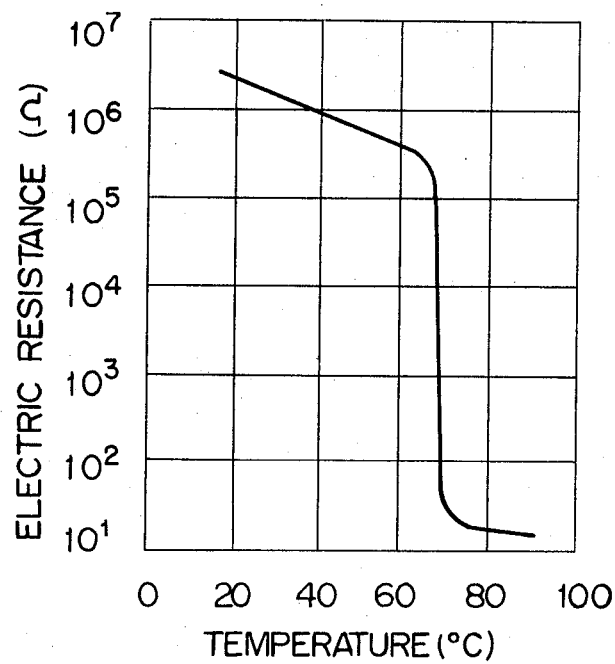
FIG. 4 is a diagram showing the resistance-temperature properties of the temperature detecting wire presented in FIG. 3.

One meter of a temperture detecting wire prepared by the aforementioned process was put in a thermostat, and the electrical resistance between both conductive wires was measured by wheatstone bridge to determine the resistance-temperature properties of the thermosensitive layer used in said temperature detecting wire. It was found that the resistance varied, as shown in FIG. 4, in an approximately vertical direction to an extent of 1/10,000 with respect to a temperature range of 70° to 75° C.

What is claimed is:

1. A method for manufacturing a temperature detecting wire which comprises the steps of heating a powdered mixture of vanadium pentoxide and an ammonium compound selected from the group consisting of diammonium hydrogen phosphate, ammonium amidosulfate, ammonium chromate, ammonium thiosulfate, ammonium sulfide, ammonium sulfate, ammonium hydrogen sulfate and ammonium phosphate to a temperature between about 500° to 550° C. in an atmosphere of inert gas, reducing most of the vanadium pentoxide to vanadium dioxide by hydrogen evolved through thermal decomposition of said ammonium compound, allowing the reaction mixture to cool in an atmosphere of inert gas, then heating it again to a temperature between about 1100° to 1200° C. to complete the reduction of vanadium pentoxide to vanadium dioxide, quenching the resultant product with cold inert gas at a temperature between about 5° to 10° C. to form a lump of fine crystals of vanadium dioxide, grinding said lump into a powder, mixing said powder with a synthetic resin binder material and forming the resulting mixture of powder and binder material as an interlayer between a pair of conductive wires to form an annular thermosensitive layer between the wires.

2. The method according to claim 1 wherein heating to 500° to 550° C. and 1100° to 1200° C. respectively are both conducted 10 to 20 minutes.

3. The method according to claim 1 wherein said inert gas is nitrogen gas.

4. The method according to claim 1 wherein said synthetic resin is one selected from the group consisting of polyurethane resin, polyester resin and acrylic resin.

5. The method of claim 1 wherein 80 to 95 parts by weight of said powder are mixed with 20 to 5 parts by weight of said binder material.

References Cited

UNITED STATES PATENTS 3,503,902 3/1970 Shimoda _____ 252—517
3,402,131 9/1968 Futaki et al. _____ 338—22 X CARL D. QUARFORTH, Primary Examiner R. L. TATE, Assistant Examiner U.S. Cl. X.R.

156—47; 252—518; 338—22